May 27, 1930. J. WHITMORE 1,760,617
APPARATUS FOR SEPARATING AND COLLECTING DUST
Original Filed April 30, 1924 3 Sheets-Sheet 1

INVENTOR
JOHN WHITMORE,

By Toulmin & Toulmin,
ATTORNEYS

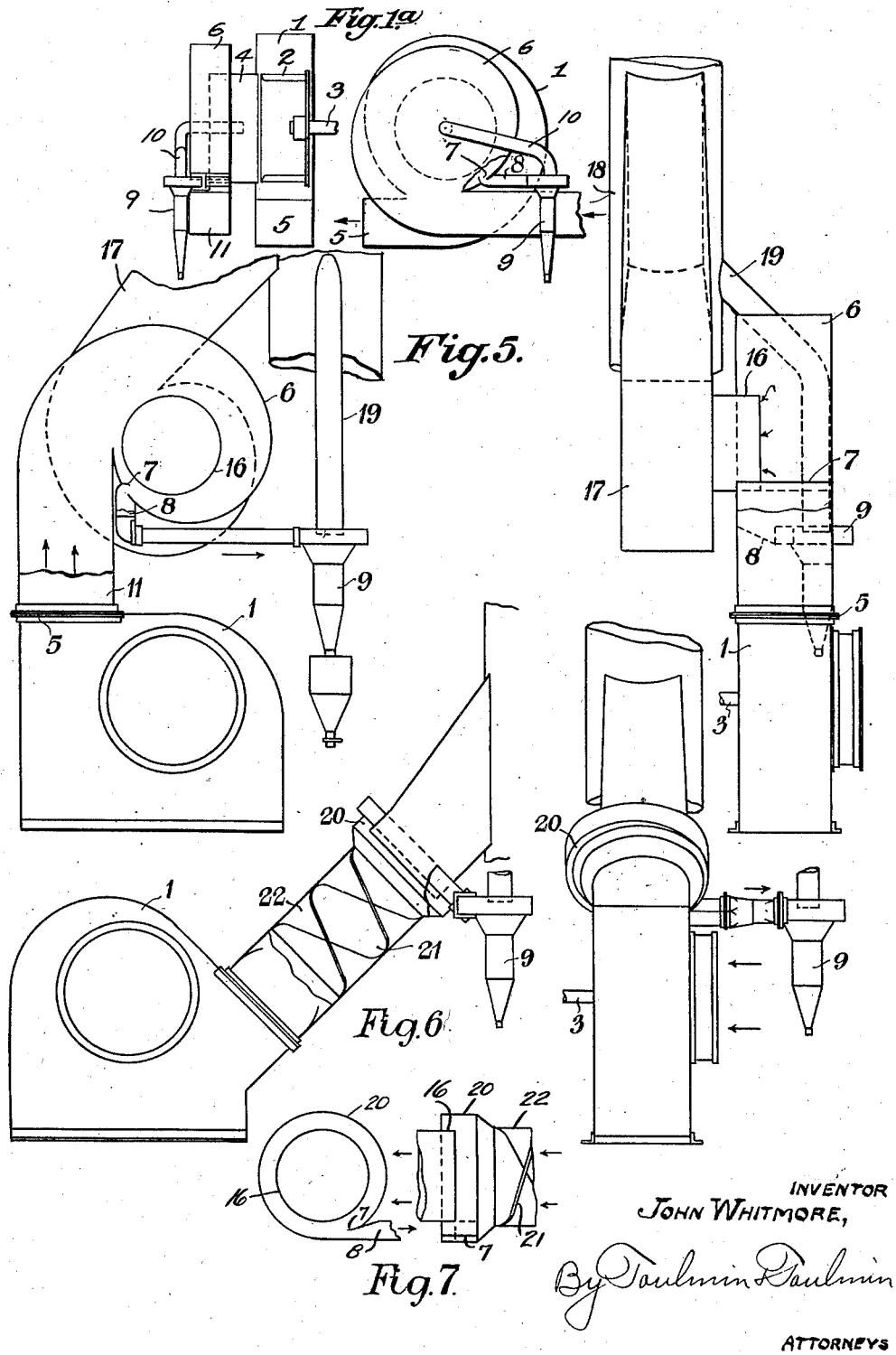

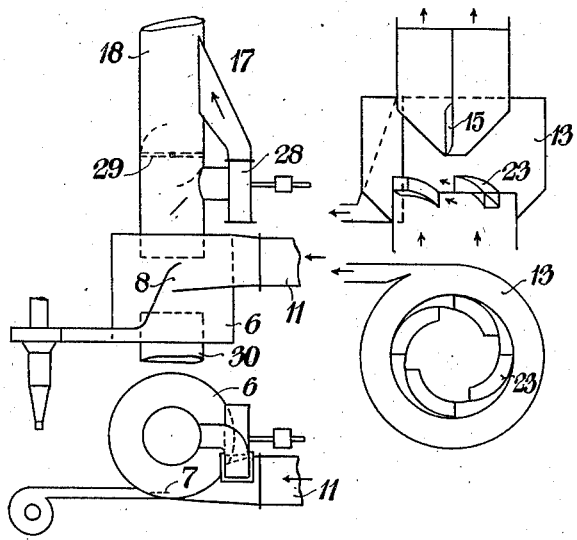
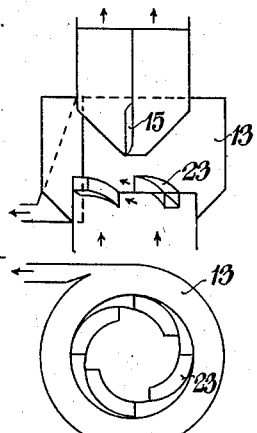
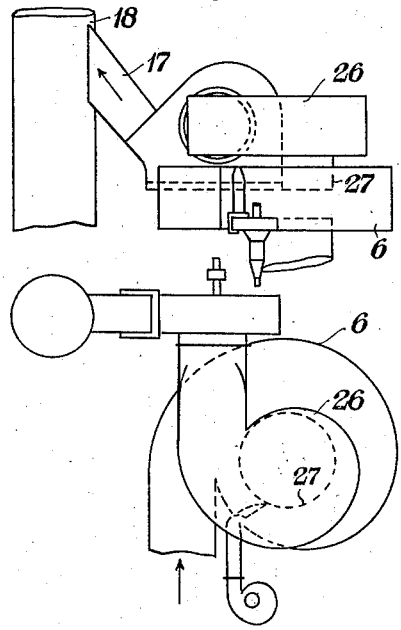
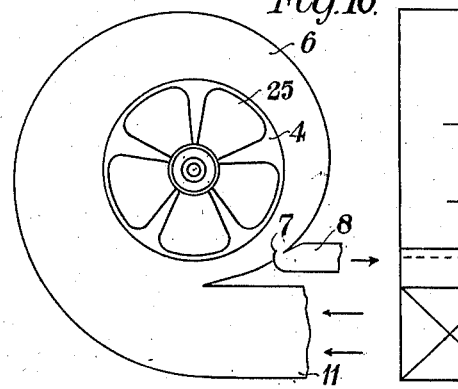
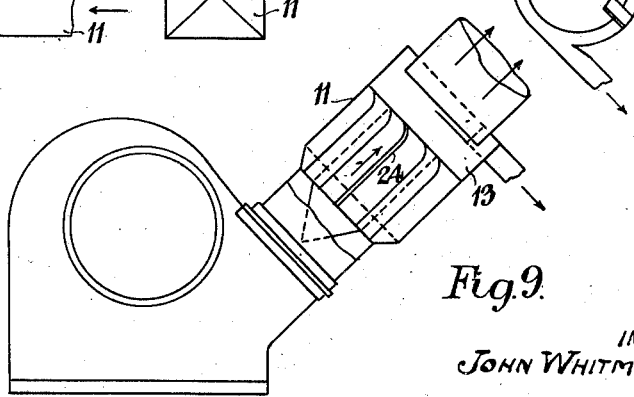

Patented May 27, 1930

1,760,617

UNITED STATES PATENT OFFICE

JOHN WHITMORE, OF BELFAST, IRELAND, ASSIGNOR TO DAVIDSON & COMPANY LIMITED, OF BELFAST, IRELAND

APPARATUS FOR SEPARATING AND COLLECTING DUST

Original application filed April 30, 1924, Serial No. 710,106, and in Great Britain January 28, 1924. Divided and this application filed December 26, 1924. Serial No. 758,111.

This invention relates to apparatus for separating and collecting dust in connection with industrial processes, calcining, and heating furnaces, boiler power plants and the like, and has for its object to provide an improved method and apparatus of this kind to recover or collect dust either because of its value, or in order to prevent the pollution of the atmosphere.

The apparatus for carrying out the improved method is more particularly designed for use in conjunction with draught or velocity producing devices, such as a fan or the like, either of the centrifugal or propeller type, but in some cases the draught may be produced by any other means, for example, by a column of hot air or gas in a chimney.

The operation is as follows:—Dust-laden air or gas is caused to rotate rapidly in the vortex or separating chamber and, as a result of the centrifugal action set up, the dust, owing to its greater specific gravity compared with that of the air or gas, is thrown outwards and rotates in close contact with the periphery of the vortex chamber whence it passes, together with a small quantity of air or gas, through a tangential passage arranged in the periphery of the vortex chamber into a dust collector or separator, for example, of the type described in British Patent No. 196,537, or to a settling chamber. The air or gas which has been rendered free of dust passes through a circular outlet arranged in the centre of the vortex chamber, or somewhat eccentric thereto, and projecting into the chamber any required distance.

Various arrangements in accordance with the invention are illustrated as examples in the accompanying diagrammatic drawings, in which Fig. 1 shows one arrangement in side and end views partly sectional, of a volute vortex chamber and a suction fan exhausting therefrom;

Fig. 5 shows in end and side views a second arrangement including a volute vortex chamber and a centrifugal fan discharging thereinto;

Fig. 6 illustrates in end and side views a modification of the arrangement shown in Fig. 5;

Figs. 7 and 8 illustrate in side and axial views means which may be employed for imparting a whirling motion to the dust-laden air or gas admitted to the vortex chamber;

Fig. 9 illustrates in side and axial views a second modification of the arrangement shown in Fig. 5;

Fig. 10 illustrates in end and side views an arrangement including a volute vortex chamber and a propeller fan exhausting therefrom;

Fig. 11 shows in side and plan views a modified arrangement in which the vortex chamber is arranged at right angles to the fan shaft;

Fig. 12 shows in side and plan views a further modification in accordance with the present invention, in which the fan is arranged to exhaust from the chimney at a point above the vortex chamber.

Figure 1:
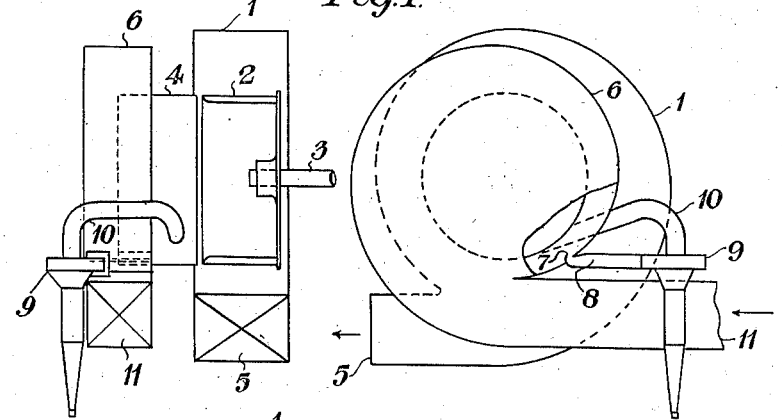
Fig. 1A shows a modification of the part arrangement shown in Fig. 1.

Referring to Fig. 1 of the drawings, a rotary fan mounted upon a horizontal shaft is shown herein connected, in accordance with the invention, to a dust collector or separator in the form of a volute or spiral casing. The fan casing is shown at 1, enclosing the rotor 2 which is keyed upon the end of the horizontal shaft 3; for driving the shaft 3 any convenient source of power may be utilized. On the suction side of the fan a cylindrical passage 4 is arranged coaxially with the shaft 3 and rotor 2, while the casing 1 is provided with a tangential discharge outlet 5. The cylindrical passage 4 constitutes an inlet to the rotor 2 of the fan and at the same time an outlet from the volute casing 6 into which the dust-laden air is caused to flow by way of the tangential inlet 11 formed by the difference between the largest and smallest radii of the volute, as shown in Fig. 1. The said volute casing 6 constitutes the vortex or separating chamber and the said outlet passage 4 therefrom may project into the said chamber to any desired extent. A lip 7 forming a tangential passage with the periphery of the chamber 6 is arranged at any desired and suitable point in the periphery of the said chamber and this lip communicates with a pocket 8 connected by a pipe to a small dust collector 9, which is preferably of the kind described in British Patent No. 196,537. The outlet pipe 10 for purified air or gas from the said small dust collector 9 may be led to the fan inlet 4 and be connected tangentially thereto as shown in Fig. 1. Alternatively the outlet pipe 10 may be arranged coaxially with the fan inlet as indicated in Figure 1A; in this case the said pipe 10 passes through the side of the vortex chamber 6 parallel with the axis of same, the outlet end being arranged to face towards the fan wheel 2. The dust outlet from the collector 9 is connected to a suitable dust receiver not shown.

In operation the action of the fan draws the dust-laden air into the tangential inlet 11 of the vortex chamber 6 and the said current of air and dust is given a whirling motion within the said chamber by the formation of the latter. As a result of the centrifugal action the dust is thrown outwards, and rotates in close contact with the periphery of the vortex chamber 6 and is caught by the lip 7 and diverted, together with a small quantity of air or gas, through the pocket 8 into the dust collector 9. The purified current of air is exhausted axially from the vortex chamber 6 through the passage 4 and through the rotor 2 of the fan and is finally exhausted at the outlet 5 of the fan, while the air or gas separated in the small dust collector 9 is passed through the pipe 10 into the passage 4 where it joins the main current of purified air or gas ejected by the fan.

Figure 2:
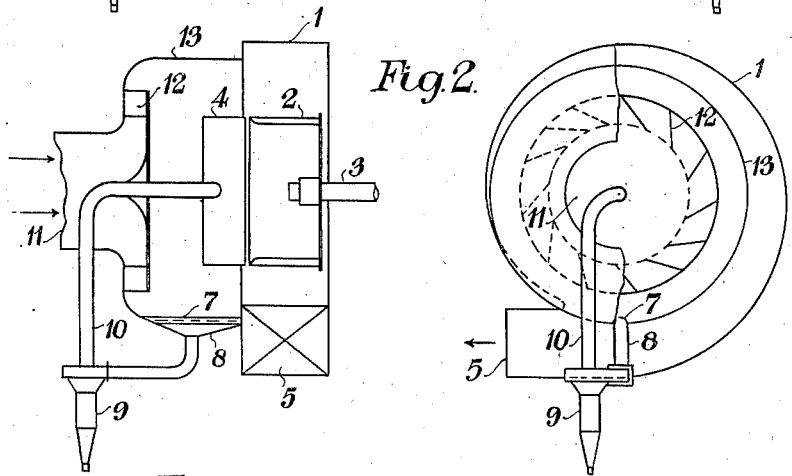
Figs. 2 and 3 illustrate modifications of the arrangement shown in Fig. 1, Fig. 2 comprising a side and a broken end view.

In the modification shown in Fig. 2 the vortex chamber 13 is given a circular instead of a volute form and the inlet 11 for the dust-laden air is arranged coaxially with the said chamber, while the necessary whirling motion is imparted to the current of dust-laden air or gas by means of stationary vanes 12 arranged in such a manner near the internal periphery of the chamber 13 that the said current is forced to pass between the said vanes in order to enter the chamber. The exit passage 4 and the fan, also the lip 7, pocket 8, dust collector 9, and pipe 10 may be arranged as previously described in connection with Fig. 1.

Figure 3:
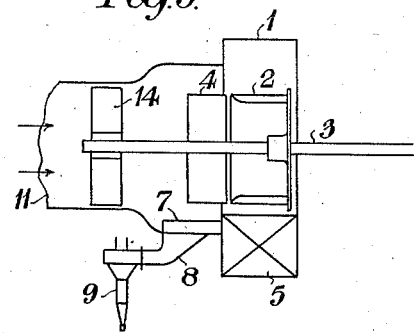

In the modification shown in Figure 3 the whirling motion is imparted to the current of dust-laden air by means of paddles 14, mounted upon an extension of the shaft 3 carrying the rotor 2 of the fan, the said paddles being arranged within the axial inlet 11 and as the air passes axially through the paddles 14 it acquires a rotory motion or whirl which causes the dust and grit to separate out by centrifugal force and on coming in contact with the lip 7 is tangentially diverted into the pocket 8 and from thence to the small collector 9, while the purified air exhausted by the fan 2 enters the inlet 4 and is discharged through the fan outlet 5.

Figure 4:
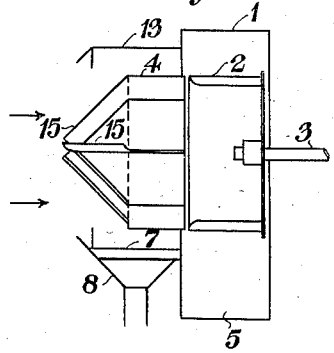
Fig. 4 illustrates an arrangement of vanes in the outlet from the vortex chamber.

Fig. 4 illustrates an arrangement of stationary vanes 15 situated in the exit passage 4, from the vortex or whirling chamber for the purpose of rectifying the flow of air or gas after same has been rendered free of dust, or in other words to produce a change of direction in the flow and cause same to follow a path parallel to the axis of the exit passage 4, in order to reduce resistance. These vanes are shown arranged in the form of a cone or pyramid, the apex of which coincides with the axis of exit passage 4, and the inclined edges of said vanes 15 are curved in such a manner that the air or gas may flow over same without shock. The arrangement now described may be applied to any of the forms illustrated, although an alternative method is referred to subsequently in connection with Figs. 5 and 11.

Referring to Fig. 5 the vortex chamber 6 is of volute form but the inlet 11 thereto is directly connected to the discharge side 5 of the fan. The necessary whirling motion is imparted to the dust-laden air or gas by blowing the same into the volute chamber 6 and the separation of the dust takes place as described above by means of a lip 7 and pocket 8, connected to a small dust collector 9, while the purified air or gas is forced through a passage 16 into the contrary volute 17 for the purpose of rectifying the flow as before described; the outlet from said volute 17 is connected to chimney 18 as shown. The outlet for the purified air or gas from the small dust collector 9 is connected to the chimney 18 by means of a pipe 19.

Fig. 6 illustrates an arrangement in which the whirling motion is imparted to the dust-laden air or gas by means of a helix 21, arranged in a casing 22, one end of said casing being attached to the outlet or discharge of fan 1, while at the opposite end is shown an enlarged portion of combined and volute construction axially mounted on casing 22. The volute as indicated terminates in an outlet connected to the inlet of the small collector 9, the outlet from the volute thus forming the tangential dust outlet.

An alternative arrangement is shown in Fig. 7 and in this case the vortex chamber 20 may be truly circular instead of compositely comprising a circular portion and a volute portion as indicated in the previous figure. The tangential dust outlet is shown at 7 and the pocket at 8, the latter being arranged for coupling to the inlet of the small collector as before described.

In the form shown in Figure 8 the whirling or vortical motion is imparted to the current of dust-laden air or gas by means of passages 23 arranged tangential to the periphery of the circular inlet, which is coaxial with the vortex chamber 13. These passages form the only means by which the air or gases may enter the vortex chamber 13, the said passages projecting through the closed inner end of the circular inlet. An arrangement of rectifying vanes is shown at 15 for converting the whirling motion of the gases into a linear motion, with the object of reducing resistance, while the dust together with some air is removed through the tangential dust outlet, and passes into the small collector, as already set forth.

Figure 9 illustrates a further modification of the arrangement shown in Figure 5, the discharge of the fan being connected to the axial inlet 11 which is fitted with a set of stationary vanes 24, the ends of said vanes nearest the vortex chamber 13 being arranged at an angle to the direction of flow of the current of dust laden air, in order to produce whirl in the vortex chamber 13. The tangential dust outlet is arranged in the periphery of the vortex chamber as usual, and the purified air outlet is concentric with the vortex chamber 13, consequently the apparatus after the dust-laden air is caused to whirl, functions in exactly the same manner as before described.

Figure 10 indicates a volute shaped vortex chamber having a fan rotor 25 mounted on the shaft 3 arranged coaxially within the outlet passage 4, the blades of the rotor and the direction of rotation of the shaft being arranged and determined so as to cause a draft through the inlet 11, the whirl being imparted to the gases by the curved periphery of the vortex chamber 6; the dust together with some air is tangentially removed by lip 7 into pocket 8 and from thence to the small collector 9 as indicated in Figure 1, the travel of the dust laden gases in Figure 1 and Figure 10 being similar in every respect.

In the arrangement shown in Figure 11 the volute shaped vortex chamber 6 is arranged horizontally while the suction side of the fan is connected to the outlet of a further volute casing 26, similar to that shown at 17 in Figure 5, provided with a connecting pipe 27 projecting downwards through the side of and into the volute chamber 6, the discharge side of the fan being connected to the chimney 18 by means of a duct 17. The lip and pocket are arranged in the periphery of the volute chamber 6 in the same manner as in Fig. 1, the dust and air accompanying same being led into the smaller collector, and from thence the dust falls into the container attached to the lower end of same, while the clean air or gas escapes at the outlet at top.

According to the arrangement shown in Fig. 12, the fan 28 is arranged to exhaust from the chimney 18 and to discharge into same again at a higher level through duct 17. A damper 29 is fitted in the chimney and occupies a position between the inlet and outlet of the fan in order to prevent the air or gas from the fan outlet duct 17 passing downwards to the inlet. It will be understood that when the damper 29 is in the position shown the dust-laden air or gas is drawn through the inlet 11 tangentially to the vortex chamber 6, the dust being separated by lip 7 and pocket 8 as before described, and the cleansed air or gas passes upwards through the lower end of the chimney which projects into the vortex chamber and from thence into the fan inlet and again enters the chimney by way of duct 17, as stated above. In the event of the fan not being in use, and natural draft conditions being in operation, the damper 29 in the chimney would be opened, so that the gases may flow past it. The gases under these conditions enter the vortex chamber 6 in an upwardly axial direction from below, by means of the by-pass flue 30, so that the collecting apparatus is short circuited. Under these circumstances, of course, it will be understood that no whirling action and no dust separation takes place. When the apparatus is in operation, the by-pass 30 is closed by means of a damper or the like, not shown, so that the dust-laden air or gas must perforce enter the vortex chamber 6 through the tangential inlet 11 in order to acquire the necessary whirl or rotation, as already described.

What I claim and desire to secure by Letters Patent is:—

1. Apparatus for separating and collecting dust from a dust-laden gaseous current, comprising in combination a primary separating chamber for the centrifugal treatment of the dust-laden current, an inlet therein for the said current, means for imparting a vortical motion to the current on entering the primary separating chamber, a tangentially projecting outlet from the primary separating chamber for the separated dust and a portion of the gaseous current, a secondary separating chamber adapted to finally separate and collect the dust from the said portion of the gaseous current, a tangential inlet thereto, a duct connecting the tangential outlet from the primary separating chamber to the tangential inlet to the secondary chamber, an axial outlet from the primary separating chamber for the main portion of the gaseous current after the separation of the dust therefrom, and a rotary fan connected so as to cause the dust-laden current to flow at the required velocity through the inlet and the purified current through the axial outlet of the primary separating chamber.

2. Apparatus for separating and collecting dust from a dust-laden gaseous current comprising in combination a volute shaped primary separating chamber for the centrifugal treatment of the dust-laden current, a tangential inlet thereto for the said current, an inwardly projecting lip, forming with the periphery of the separating chamber, a tangential dust and air outlet, an axial outlet from the primary separating chamber for the main portion of the gaseous current, after the separation of the dust therefrom, a rotary fan, connected so as to cause the dust-laden current to flow at the required velocity through the inlet and the purified current through the axial outlet of the primary separating chamber, a secondary separating chamber having a tangential inlet permanently connected to the tangential dust and air outlet from the primary separating chamber, an air or gas outlet at the top of said secondary separating chamber connected to the axial outlet from the primary separating chamber at a point between the said primary separating chamber, and the said rotary fan, and a dust outlet at the lower end of the said secondary separating chamber connected to a suitable receptacle for the dust.

3. In a dust collecting apparatus, a primary separating chamber, means to collect dust separated therein and a portion of the air carrying the dust, a secondary dust collecting chamber connected to said collecting means for the final collection of the dust, an outlet from the primary separating chamber, and an outlet connected thereto and to the secondary collecting chamber, and means for causing the dust-laden air to enter the primary collecting chamber and the dust free air to be discharged through the primary collecting chamber outlet.

4. In a dust collector, the combination of a primary vortical dust collecting chamber having an inlet for air and dust arranged tangentially thereof with an air outlet arranged at right angles to the main plane of said chamber, means to induce the entrance of the air and dust to the primary chamber and to induce the exist of dust free air therefrom, a secondary dust collecting chamber, means connected thereto and to the primary chamber for removing the dust and a portion of the air from the primary chamber to the secondary chamber, and means for conveying the air from the secondary chamber into the outlet of the dust free air of the primary chamber.

5. In a dust collector, the combination of a primary vortical dust collecting chamber having an inlet for air and dust arranged tangentially thereof with an air outlet arranged at right angles to the main plane of said chamber, means to induce the entrance of the air and dust to the primary chamber and to induce the exist of dust free air therefrom, a secondary dust collecting chamber, means connected thereto and to the primary chamber for removing the dust and a portion of the air from the primary chamber to the secondary chamber, and means for conveying the air from the secondary chamber into the outlet of the dust free air of the primary chamber, said means for removing the dust and a portion of the air from the primary chamber being so arranged as to tangentially project from the primary chamber and into the secondary chamber.

6. In combination in a dust collecting apparatus of a vertically-disposed primary dust collecting vortical chamber having a tangentially-disposed inlet, a centrally-disposed clean air outlet located at right angles thereto, a rotor chamber connected thereto parallel to the primary collecting chamber having a tangentially-disposed clean air outlet, a rotor therein, a relatively small secondary dust collecting chamber, a tangentially-disposed means for collecting dust and a portion of the air from the primary chamber to deliver it to the secondary chamber, and a clean air outlet from the secondary chamber connected into the clean air outlet of the primary chamber.

7. In a dust collecting apparatus, the combination of a relatively shallow vortical dust removing chamber having a tangentially-disposed inlet for air and dust, a depending dust receiving chamber of narrowing diameter and a vertically-disposed, centrally-located, dust free, air receiving passageway.

8. In a dust collecting apparatus, the combination of a relatively shallow vortical dust removing chamber having a tangentially-disposed inlet for air and dust, a depending dust receiving chamber of narrowing diameter and a vertically-disposed, centrally-located, dust free air receiving passageway, and means to induce the exit of air through the dust free air passageway while the dust removed therefrom falls in the dust receiving chamber by gravity.

9. Apparatus for separating and collecting dust from a dust-laden gaseous current, comprising in combination a volute-shaped primary separating chamber permitting of repeated revolution therein of the said current for the centrifugal treatment of the same, a tangential inlet thereto for the said current, an inwardly projecting lip forming with the periphery of the separating chamber a tangential dust and air outlet, an axial outlet from the primary separating chamber for the main portion of the gaseous current, after the separation of the dust therefrom, a rotary fan connected so as to cause the dust-laden current to flow at the required velocity through the inlet and the purified current through the axial outlet of the primary separating chamber, a secondary separating chamber having a tangential inlet permanently connected to the tangential dust and air outlet from the primary separating chamber, an air or gas outlet at the top of said secondary separating chamber connected to the axial outlet from the primary separating chamber at a point between the said primary separating chamber and the said rotary fan, and a dust outlet at the lower end of the said secondary separating chamber connected to a suitable receptacle for the dust.

10. In a dust-separating apparatus, the combination with a horizontally arranged primary separating chamber, of a tangential inlet thereto for the dust-laden gaseous current, a tangential outlet therefrom for the separated dust, an axial outlet from the said primary separating chamber for the main portion of the gaseous current after the separation of the dust therefrom, a horizontally arranged fan co-axial with said primary separating chamber, a pipe connection from the said axial outlet from the primary separating chamber to the eye of the said fan, a tangential outlet from the fan casing for the purified gas, a vertically arranged secondary separating chamber, a tangential inlet thereto for the separated dust and a portion of the gas escaping from the primary separating chamber, a vertically directed axial outlet for the purified gas, a connection therefrom to the side of the primary separating chamber opposite to that in which the axial outlet is placed, and means for collecting the dust from said secondary separating chamber.

11. Apparatus for separating and collecting dust from a dust-laden gaseous current, comprising in combination a volute-shaped primary separating chamber with its axis horizontally arranged, a tangential inlet thereto for the dust-laden current, a tangential outlet for dust and air from said primary separating chamber arranged so that the dust-laden current must make at least approximately one revolution in the separating chamber before reaching said outlet, a volute-shaped fan casing with its axis horizontally arranged and coaxial with the primary separating chamber, a tangential air outlet therefrom, a fan rotor mounted in said casing with its shaft coaxial therewith, a cylindrical passage coaxial with the primary separating chamber and the fan casing and leading from the central part of the former to the fan rotor, an opening in the wall of said passage, a volute-shaped secondary separating chamber with its axis vertically arranged, a tangential inlet thereto for dust and air, a duct connecting the tangential outlet from the primary separating chamber to the tangential inlet of the secondary separating chamber, a vertically directed outlet for dust-freed air arranged co-axially with the secondary separating chamber, a duct connecting the said air outlet to the opening in the wall of the said cylindrical passage, a dust collector arranged beneath the secondary separating chamber, and means for collecting the dust therefrom.

12. In a dust-separating apparatus the combination with a horizontally arranged separating chamber, of a tangential inlet thereto for the dust-laden gaseous current, a tangential outlet therefrom for the separated dust, an axial outlet from the said separating chamber for the main portion of the gaseous current after the separation of the dust therefrom, a horizontally arranged fan casing parallel with the separating chamber, the eye of the fan casing being connected to the said axial outlet from the separating chamber, a rotary fan element mounted in the fan casing so as to draw the dust-laden current through the said tangential inlet into, and the purified gas current through said axial outlet from, the separating chamber, and a tangential outlet from the fan casing for the said purified current.

In testimony whereof I affix my signature.

JOHN WHITMORE.